United States Patent
Tate et al.

(10) Patent No.: US 12,441,200 B2
(45) Date of Patent: Oct. 14, 2025

(54) POWER STORAGE DEVICE

(71) Applicant: HONDA MOTOR CO., LTD., Tokyo (JP)

(72) Inventors: Ryu Tate, Saitama (JP); Shoshi Hidaka, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 1344 days.

(21) Appl. No.: 17/115,809

(22) Filed: Dec. 9, 2020

(65) Prior Publication Data

US 2021/0178913 A1 Jun. 17, 2021

(30) Foreign Application Priority Data

Dec. 17, 2019 (JP) .................................. 2019-227441

(51) Int. Cl.
| | |
|---|---|
| *B60L 50/64* | (2019.01) |
| *H01M 10/613* | (2014.01) |
| *H01M 10/625* | (2014.01) |
| *H01M 10/6556* | (2014.01) |
| *H01M 50/209* | (2021.01) |
| *H01M 50/244* | (2021.01) |
| *H01M 50/249* | (2021.01) |
| *H01M 50/262* | (2021.01) |

(52) U.S. Cl.
CPC ........... *B60L 50/64* (2019.02); *H01M 10/613* (2015.04); *H01M 10/625* (2015.04); *H01M 10/6556* (2015.04); *H01M 50/209* (2021.01); *H01M 50/244* (2021.01); *H01M 50/249* (2021.01); *H01M 50/262* (2021.01); *H01M 2220/20* (2013.01)

(58) Field of Classification Search
None
See application file for complete search history.

(56) References Cited

U.S. PATENT DOCUMENTS

2010/0081038 A1\* 4/2010 Hofmann .......... H01M 10/6552
429/50
2017/0274751 A1 9/2017 Obrist et al.

FOREIGN PATENT DOCUMENTS

| CN | 108382177 A | 8/2018 |
|---|---|---|
| JP | 2017531290 A | 10/2017 |
| JP | 2018041653 A | 3/2018 |
| JP | 2019202709 A | 11/2019 |

OTHER PUBLICATIONS

Machine translation of 108382177 (Year: 2018).\*
Machine translation of 2018041653 (Year: 2018).\*

\* cited by examiner

*Primary Examiner* — Maria Laios
(74) *Attorney, Agent, or Firm* — CKC & Partners Co., LLC

(57) ABSTRACT

A power storage device comprises: a cell group in which a plurality of battery cells are stacked; a cylindrical housing part that houses the cell group and has an opening at each end in a stacking direction of the battery cells; an end plate that covers the opening in the housing part; a vehicle body fastening member that is formed separately from the housing part and fastens the housing part to a vehicle body; and a bolt that fastens the end plate to the housing part, wherein the vehicle body fastening member has a threaded portion to be threadedly engaged with the bolt, and is fixed to the housing part by threadedly engaging the threaded portion with the bolt provided through the end plate and the housing part.

6 Claims, 6 Drawing Sheets

POWER STORAGE DEVICE

This application is based on and claims the benefit of priority from Japanese Patent Application No. 2019-227441, filed on 17 Dec. 2019, the content of which is incorporated herein by reference.

BACKGROUND OF THE INVENTION

Field of the Invention

The present invention relates to a power storage device.

Related Art

There has been conventionally known a battery housing in which a plurality of battery cells are housed, the housing having side surfaces to which a plurality of fixing flanges for fastening to a vehicle are welded (see Patent Document 1).
Patent Document 1: Japanese Unexamined Patent Application (Translation of PCT Application), Publication No. 2017-531290

SUMMARY OF THE INVENTION

However, when the fixing flanges are welded to the side surfaces of the housing, there are problems in that it is difficult to position the fixing flanges on the side surfaces of the housing, and complicated work of welding the fixing flanges one by one in sequence is needed. In addition, distortion (thermal distortion) occurs in the housing due to heat input at the time of welding, which may cause the positions of the fixing flanges to deviate with respect to a vehicle body frame. If the positions of the fixing flanges deviate, the fastening portions may deviate with respect to the vehicle body frame, or a distance between the housing and the vehicle body frame may deviate, which may make it difficult to fasten the housing to the appropriate positions of the vehicle body frame.

The present invention has an object to provide a power storage device to which a vehicle body fastening member can be easily positioned and reliably attached.

(1) A power storage device according to the present invention (for example, a power storage device 1 described later) comprises: a cell group (for example, a cell group 3 described later) in which a plurality of battery cells (for example, battery cells 31 described later) are stacked; a cylindrical housing part (for example, a housing part 2 described later) that houses the cell group and has an opening (for example, an opening 20a described later) at each end in a stacking direction (for example, an X direction described later) of the battery cells; an end plate (for example, an end plate 4 described later) that covers the opening in the housing part; a vehicle body fastening member (for example, a vehicle body fastening member 5 described later) that is formed separately from the housing part and fastens the housing part to a vehicle body; and a bolt (for example, a bolt 6 described later) that fastens the end plate to the housing part, wherein the vehicle body fastening member has a threaded portion (for example, a threaded portion 56 described later) to be threadedly engaged with the bolt, and is fixed to the housing part by threadedly engaging the threaded portion with the bolt provided through the end plate and the housing part.

According to the above-described (1), since the vehicle body fastening member is fixed to the housing part by threadedly engaging, with the threaded portion, the bolt for fastening the end plate to the housing part, the vehicle body fastening member can be easily positioned and reliably attached to the housing part without the need for welding.

(2) The power storage device according to (1) may be configured in which the vehicle body fastening member includes an engagement protruding portion (for example, an engagement protruding portion 52 described later) that protrudes toward the housing part and includes the threaded portion in the engagement protruding portion, an outer surface of the housing part includes an engagement recessed portion (for example, an engagement recessed portion 28 described later) to be engaged with the engagement protruding portion of the vehicle body fastening member, and the bolt is threadedly engaged with the threaded portion in the engagement protruding portion to be housed in the engagement recessed portion.

According to the above-described (2), since the threaded portion can be aligned with the bolt just by engaging (fitting) the engagement protruding portion of the vehicle body fastening member with (in) the engagement recessed portion of the housing part 2, the vehicle body fastening member can be further easily positioned with respect to the housing part.

(3) The power storage device according to (2) may be configured in which the engagement recessed portion of the housing part is disposed in a corner (for example, corners 2a, 2b described later) extending in a length direction of the housing part, and a bolt insertion hole (for example, a bolt insertion hole 27 described later) into which the bolt is to be inserted is provided inside the corner to open to the engagement recessed portion.

According to the above-described (3), since the bolt insertion hole is disposed inside the corner having high rigidity in the housing part, both of the end plate and the vehicle body fastening member can be firmly fixed to the housing part.

(4) The power storage device according to (3) may be configured in which the vehicle body fastening member includes a pair of the engagement protruding portions protruding in a U-shape toward the housing part, and the engagement recessed portions of the housing part are provided on the two corners adjacent to each other in the housing part to correspond to the pair of engagement protruding portions of the vehicle body fastening member, respectively.

According to the above-described (4), the vehicle body fastening member can be stably fixed to the housing part by the pair of engagement protruding portions.

(5) The power storage device according to any one of (1) to (4) may be configured in which the vehicle body fastening member is disposed on side wall portions (for example, side wall portions 23 described later) facing each other in a width direction (for example, a Y direction described later) of the housing part.

According to the above-described (5), a dimension in the height direction of the power storage device can be suppressed even when the vehicle body fastening members are attached to the housing part.

(6) The power storage device according to (5) may be configured in which a cavity portion (for example, a cavity portion 253 described later) is provided inside the side wall portion of the housing part, and the vehicle body fastening member is further fixed to the side wall portion by a blind nut (for example, a blind nut 8 described later) to be inserted into the cavity portion from an outer surface (for example, an outer surface 23a described later) of the side wall portion.

According to the above-described (6), the vehicle body fastening member can be fixed more firmly to the housing part. Since the vehicle body fastening member is fixed to the side wall portion using the blind nut, the vehicle body fastening member can be reliably fixed even when a thickness of a portion in the side wall portion through which the blind nut is to be inserted is small.

(7) The power storage device according to (6) may be configured in which the side wall portion of the housing part includes at least two heat exchange medium flow paths (for example, an upper flow path 251 and a lower flow path 252 described later) that are arranged in a height direction of the side wall portion along a length direction of the housing part, and the cavity portion is disposed between the two heat exchange medium flow paths.

According to the above-described (7), the cavity portion can be provided in the side wall portion even when a flow path through which a heat exchange medium flows is provided in the side wall portion of the housing part, the heat exchange medium exchanging heat with the battery cells. Since the cavity portion separates the two flow paths, heat exchange between the two flow paths can be suppressed, and heat can be efficiently exchanged between the heat exchange medium and the battery cells.

The present invention can provide a power storage device to which a vehicle body fastening member can be easily positioned and be reliably attached.

DETAILED DESCRIPTION OF THE INVENTION

Figure 1:
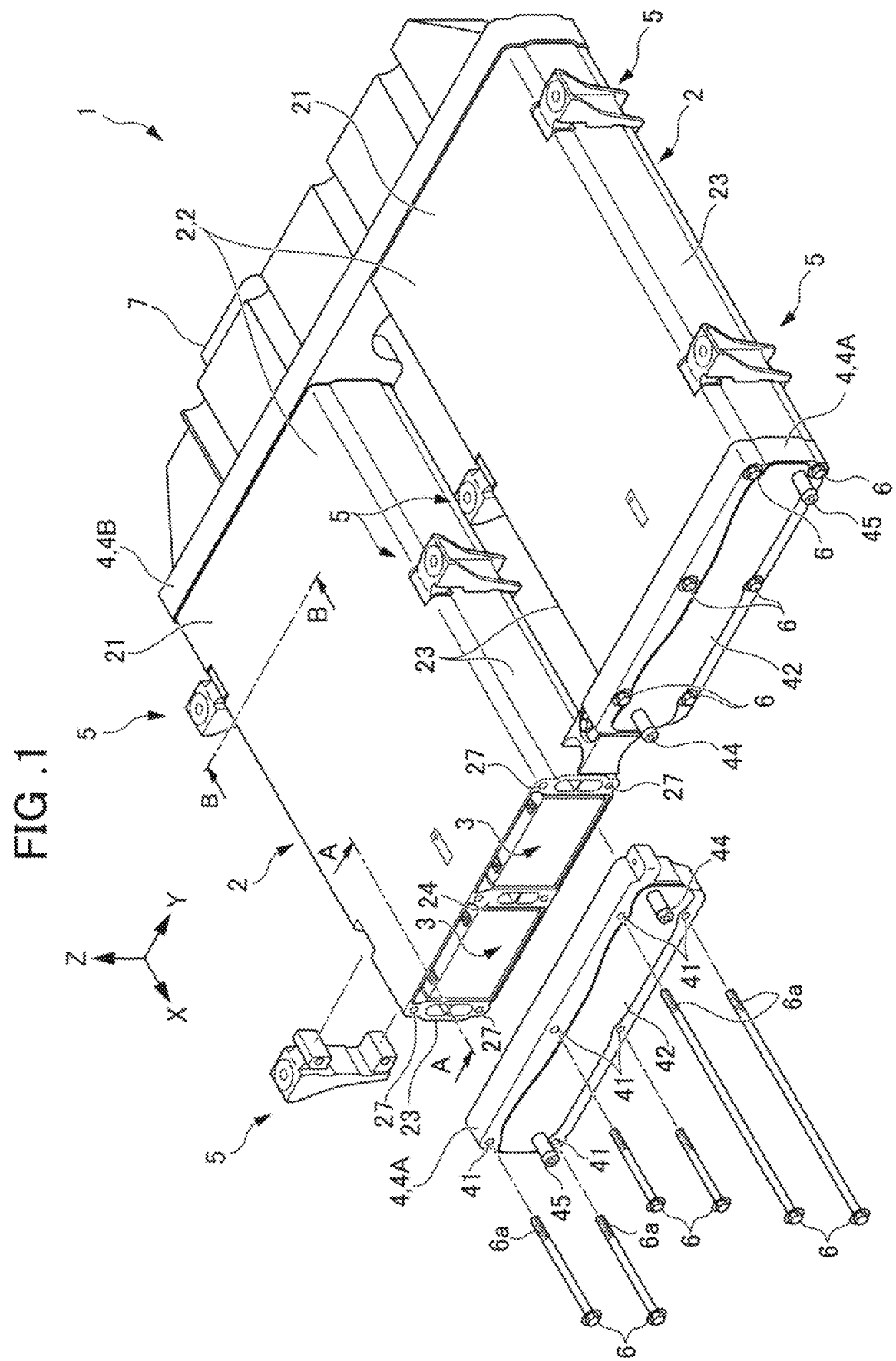
FIG. 1 is an overall perspective view illustrating a power storage device according to one embodiment of the present invention.
Figure 2:
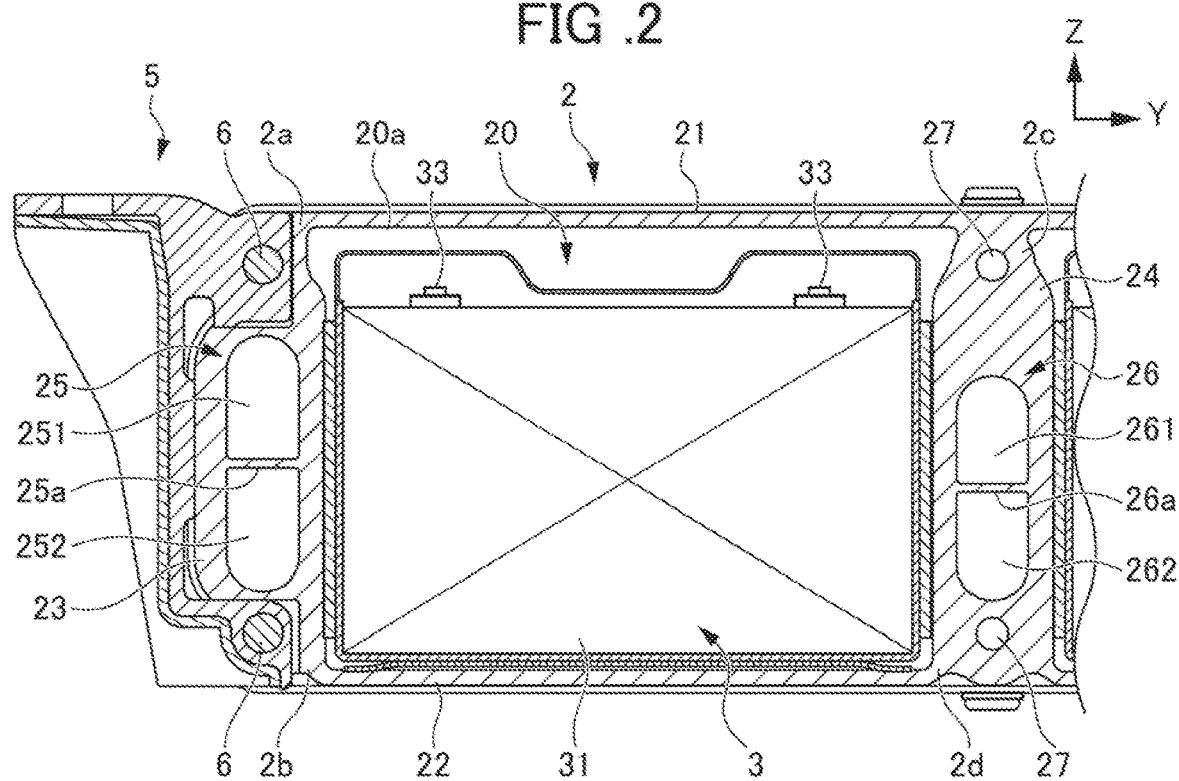
FIG. 2 is a cross-sectional view along line A-A in FIG. 1.
Figure 3:
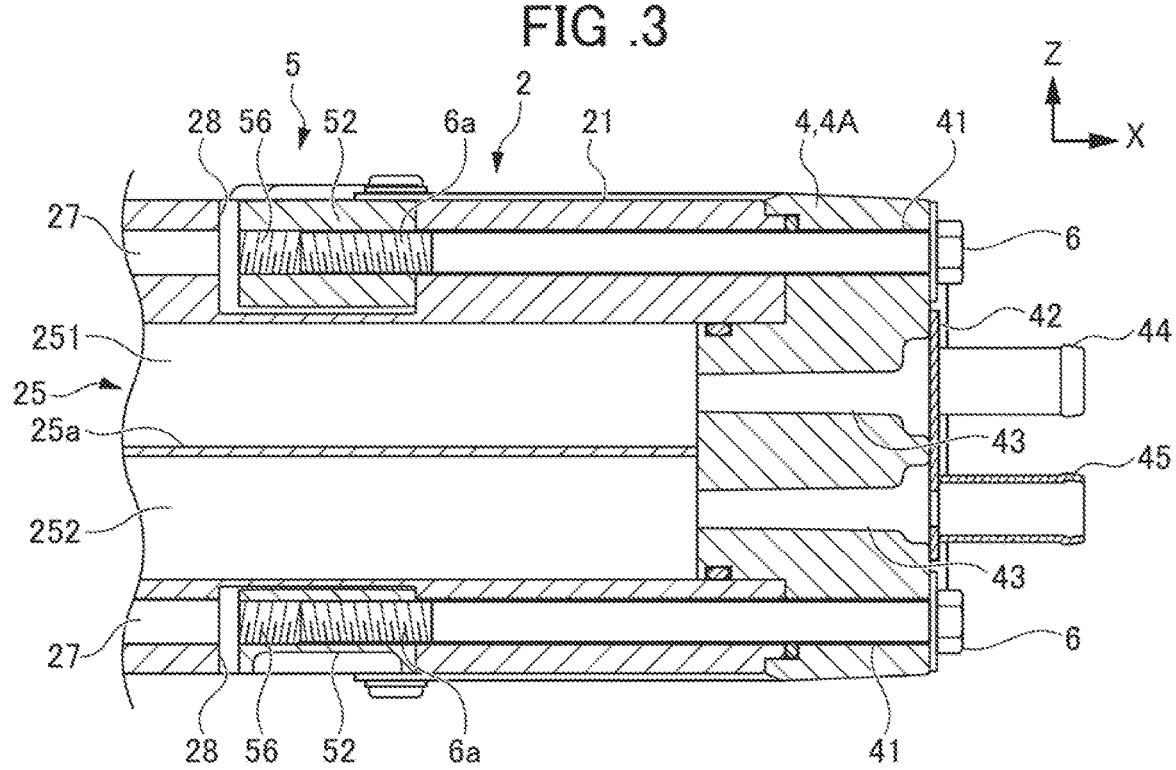
FIG. 3 is a cross-sectional view along line B-B in FIG. 1.
Figure 4:
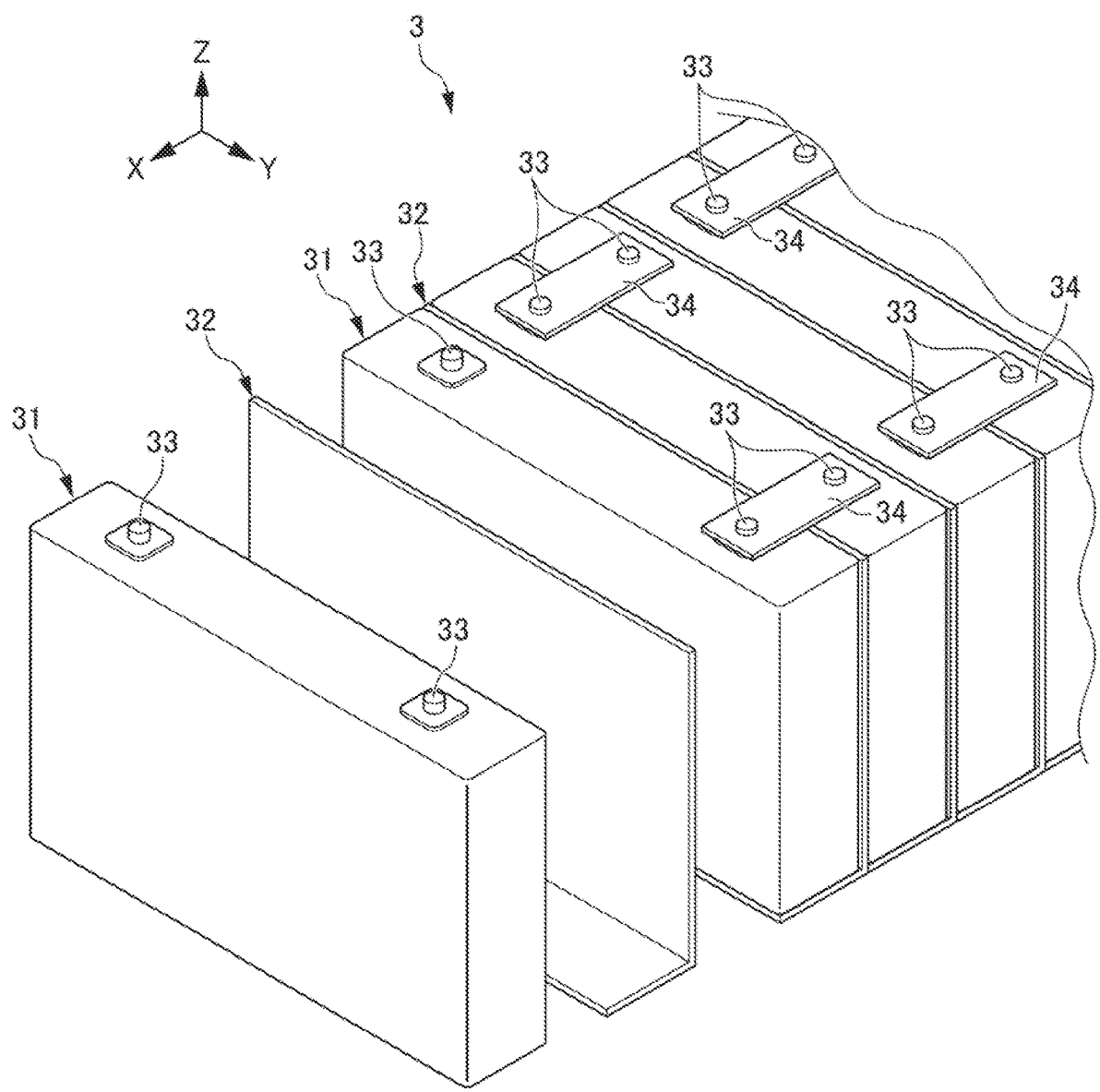
FIG. 4 is a perspective view illustrating a configuration of a cell group.
Figure 5:
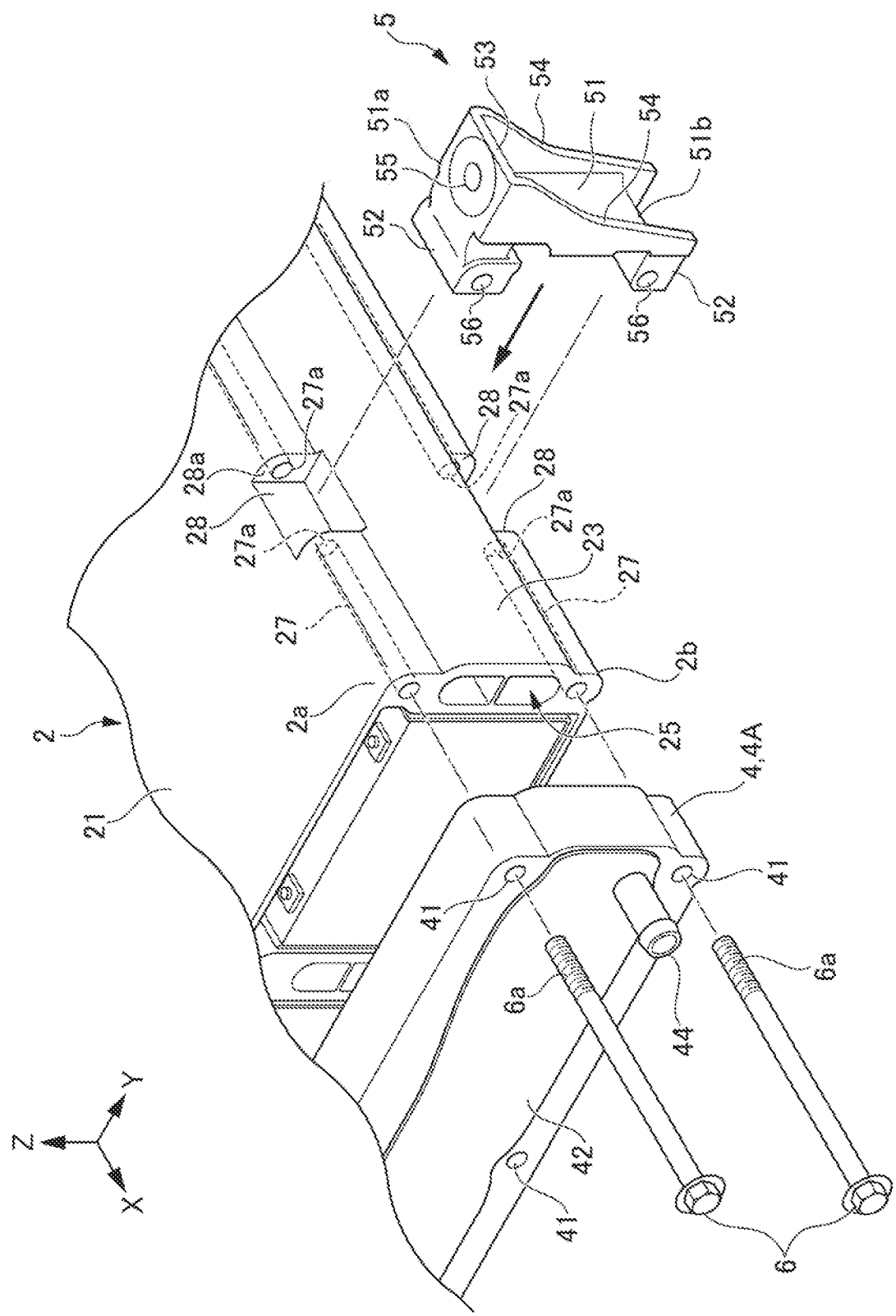
FIG. 5 is an exploded perspective view illustrating a portion of the power storage device illustrated in FIG. 1 in an enlarged manner.

Hereinafter, embodiments of the present invention will be described with reference to the drawings. FIG. 1 is an overall perspective view illustrating a power storage device according to one embodiment of the present invention. FIG. 2 is a cross-sectional view along line A-A in FIG. 1. FIG. 3 is a cross-sectional view along line B-B in FIG. 1. FIG. 4 is a perspective view illustrating a configuration of a cell group. FIG. 5 is an exploded perspective view illustrating a portion of the power storage device illustrated in FIG. 1 in an enlarged manner. As illustrated in FIG. 1, a power storage device 1 includes a housing part 2, a cell group 3 to be housed in the housing part 2, an end plate 4, and a plurality of vehicle body fastening members 5 for fastening the housing part 2 to a vehicle body (not illustrated).

In directions indicated by arrows in each drawing of the present specification, a direction along an X direction indicates a length direction of the power storage device 1 and the housing part 2. A direction along a Y direction indicates a width direction of the power storage device 1 and the housing part 2. A direction along a Z direction indicates a height direction of the power storage device 1 and the housing part 2.

The housing part 2 illustrated in the present embodiment is a case made of metal such as aluminum or an aluminum alloy, and is formed in a horizontally long quadrangular cylindrical shape in which a dimension in the width direction (Y direction) is larger than that in the height direction (Z direction). The housing part 2 is an extrusion-molded product formed by extrusion molding along one direction (X direction). Since the housing part 2 constituted by the extrusion-molded product can be easily formed and does not have a joint portion in which plate members are joined to each other, assembly variation or thermal distortion arising from the joint portion does not occur. Hence, the housing part 2 has a stable shape.

Note that two housing parts 2, 2 are disposed in parallel in the power storage device 1 illustrated in the present embodiment. However, it is only required that at least one housing part 2 is disposed in the power storage device 1. Since the two housing parts 2, 2 have substantially the same structure (bilaterally symmetric structure), in the following description, one housing part 2 will be described.

The housing part 2 includes an upper wall portion 21 and a lower wall portion 22 facing each other in the height direction, two side wall portions 23, 23 facing each other in the width direction, and one middle wall portion 24 disposed between the side wall portions 23, 23 and extending in parallel with the side wall portions 23, 23 from the upper wall portion 21 to the lower wall portion 22. In the housing part 2, two rows of housing spaces 20, 20 each for housing the cell group 3 are formed as spaces surrounded by the upper wall portion 21, the lower wall portion 22, the side wall portions 23, 23, and the middle wall portion 24. Openings 20a, 20a formed in a horizontally long rectangular shape are open in both ends of the housing part 2 in the length direction (X direction), respectively, so that the housing spaces 20, 20 communicate with the outside.

Heat exchange medium flow paths 25, 26 through which heat exchange media to be subjected to heat exchange with the battery cells 31 (described later) forming the cell groups 3, 3 flow are provided inside the side wall portions 23, 23 and inside the middle wall portion 24 of the housing part 2, respectively. The heat exchange medium flow paths 25, 26 extend along the entire length of the housing part 2 in the length direction, and each is opened to both ends of the housing part 2 in the length direction. As illustrated in FIG. 2 and FIG. 3, the heat exchange medium flow paths 25, 26 are divided into the upper flow paths 251, 261 and the lower flow paths 252, 262 by flow path partition walls 25a, 26a extending along the length direction of the housing part 2 at a substantially center portion of the housing part 2 in the height direction, respectively. The upper flow path 251 and the lower flow path 252 are aligned with the upper flow path 261 and the lower flow path 262 in the height direction of the housing part 2, respectively.

As illustrated in FIG. 4, each of the cell groups 3, 3 housed in the respective housing spaces 20, 20 of the housing part 2 is configured by stacking along the X direction a plurality of battery cells 31 formed in a rectangular parallelepiped shape, for example, lithium ion secondary batteries. Each of plate-shaped insulating separators 32 is disposed between the battery cells 31, 31 adjacent to each other in the stacking direction. The battery cell 31 is configured by housing an electrode body (not illustrated) in a cell case made of aluminum, an aluminum alloy or the like, and has a pair of positive and negative electrode terminals 33, 33 on the upper surface. The electrode terminals 33, 33 of the battery cells 31, 31 adjacent to each other in the stacking direction are electrically connected by a bus bar 34. Accordingly, all the battery cells 31 configuring one cell group 3 are electrically connected in series or in parallel.

The cell groups 3, 3 are inserted into the respective housing spaces 20, 20 in the housing part 2 from the respective openings 20a, 20a in the stacking direction of the battery cells 31, thereby being housed in the housing part 2. Each of the cell groups 3, 3 are sandwiched between the side wall portion 23 and the middle wall portion 24. Therefore, even when two rows of cell groups 3, 3 are housed in one housing part 2, heat can be efficiently exchanged with the heat exchange media flowing through the heat exchange medium flow paths 25, 26 at both sides of each of the battery cells 31 in the width direction. The cell groups 3, 3 housed in the housing part 2 may be integrated by a restraining band or the like (not illustrated) in order to maintain the state in which the battery cells 31 are stacked. One housing part 2 illustrated in the present embodiment includes two rows of housing spaces 20, 20, and houses the two cell groups 3, 3 in parallel. However, it is only required that one housing part 2 includes at least one housing space 20.

The end plate 4 is disposed to cover the openings 20a, 20a at each end of the housing part 2. As illustrated in FIG. 1, end plates 4A, 4A disposed at one end (an end on the lower left side in FIG. 1) of the housing parts 2, 2 in the length direction are individually provided to correspond to the two housing parts 2, 2, respectively, and are integrally connected by a connection member 40 between the housing parts 2, 2. In addition, an end plate 4B disposed at the other end (an end on the upper right side in FIG. 1) of the housing parts 2, 2 in the length direction is provided in common over the two housing parts 2, 2.

The housing part 2 includes bolt insertion holes 27 for inserting bolts 6 therethrough in a corner 2a between the upper wall portion 21 and the side wall portion 23, a corner 2b between the lower wall portion 22 and the side wall portion 23, a corner 2c between the upper wall portion 21 and the middle wall portion 24, and a corner 2d between the lower wall portion 22 and the middle wall portion 24, thereby to fasten the end plate 4. Each of the corners 2a to 2d extends in the length direction of the housing part 2. Each of the bolt insertion holes 27 extends along the entire length of the housing part 2 in the length direction of the housing part 2.

The end plate 4 is fixed to the housing part 2 by a plurality of bolts 6 corresponding to the respective bolt insertion holes 27. That is, a plurality of bolt insertion holes 41 corresponding to the respective bolt insertion holes 27 in the housing part 2 are provided in each end plate 4 (4A, 4B). The end plate 4 is fastened to each of the housing parts 2, 2 by the bolts 6 inserted through the respective bolt insertion holes 41 in the end plate 4 and the respective bolt insertion holes 27 in the housing part 2 from the outer surface side of the end plate 4.

As illustrated in FIG. 1 and FIG. 3, flow path members 42, 42 for allowing communication with the heat exchange medium flow paths 25, 26 in each of the housing parts 2, 2 are provided on outer surfaces of the end plates 4A, 4A provided individually to the two housing parts 2, 2, respectively. As illustrated in FIG. 3, the flow path member 42 communicates with the heat exchange medium flow paths 25, 26 opening at end portions of the housing part 2, via passageways 43, 43 that pass through the end plate 4. An inlet port 44 and an outlet port 45 for the heating medium are provided in the flow path member 42. In this way, the heat exchange medium having flowed from the inlet port 44 in one housing part 2 flows through the heat exchange medium flow paths 25, 26 in one way via the flow path member 42 and the passageway 43, flows through the passageway 43 and the flow path member 42 again, and flows from the outlet port 45 to the outside.

As illustrated in FIG. 1, an interface box 7 is attached to the end plate 4B provided in common over the two housing parts 2, 2, to electrically connect between the battery cells 31 configuring each of a plurality of cell groups 3 in each of the housing parts 2, 2 and an external device (not illustrated).

The vehicle body fastening member 5 is a bracket for fastening the power storage device 1 (the housing part 2) to a vehicle body frame (not illustrated) by a fastening member (not illustrated) such as a bolt, and is formed of, for example, aluminum or an aluminum alloy, separately from the housing part 2. A plurality of vehicle body fastening members 5 are provided for one housing part 2. It is desirable that the plurality of vehicle body fastening members 5 provided for one housing part 2 are disposed separately from one another in the width direction of the housing part 2, to stably attach the housing part 2 with respect to the vehicle body frame (not illustrated). In the present embodiment, two vehicle body fastening members 5 are provided on each of the side wall portions 23, 23 disposed outside the housing parts 2, 2, and one vehicle body fastening member 5 is provided on each of the side wall portions 23, 23 disposed between the housing parts 2, 2.

As illustrated in FIG. 5, the vehicle body fastening member 5 includes a rectangular plate-shaped fastening member body 51 having a height substantially equal to that of the side wall portion 23 of the housing part 2, a pair of engagement protruding portions 52, 52 protruding in a U-shape toward the housing part 2 from an upper end 51a and a lower end 51b of the fastening member body 51, respectively, and a flange portion 53 protruding from the upper end 51a of the fastening member body 51 in a direction opposite to the engagement protruding portion 52. A pair of reinforcing plate portions 54, 54 are provided at both ends of the fastening member body 51 in the width direction, to be slantingly connected between the flange portion 53 and the lower end 51b of the fastening member body 51. Thus, the vehicle body fastening member 5 is reduced in weight without decreasing the strength.

A fastening member insertion hole 55 through which the fastening member for fastening to the vehicle body frame (not illustrated) is to be inserted is provided in the flange portion 53, to pass through in an up-and-down direction. In the pair of engagement protruding portions 52, 52, respective threaded portions 56, 56 passing therethrough are provided in the length direction (X direction) of the housing part 2. On each of the inner surfaces of the threaded portions 56, 56, a female thread (not illustrated) is formed to be threadedly engaged with the corresponding bolt 6 for fastening the end plate 4.

As illustrated in FIG. 5, in an outer surface of the housing part 2, a pair of engagement recessed portions 28, 28 are provided in the upper and lower corners 2a, 2b of the side wall portion 23 to be engaged with the pair of engagement protruding portions 52, 52 of the vehicle body fastening member 5, respectively. The vehicle body fastening member 5 is to be attached to a region in the housing part 2 in which the pair of engagement recessed portions 28, 23 are provided. Accordingly, in the housing part 2, the pair of upper and lower engagement recessed portions 28, 28 are provided, corresponding to the attaching positions and the number of vehicle body fastening members 5.

The engagement recessed portion 28 is formed by cutting off the housing part 2 from the outer surface thereof to have a shape corresponding to an outer shape of the engagement protruding portion 52 of the vehicle body fastening member 5. The engagement recessed portion 28 is formed to divide the bolt insertion hole 27 in each of the corners 2a, 2b of the housing part 2. Accordingly, the divided bolt insertion hole 27 has insertion hole openings 27a, 27a formed in inner surfaces 28a, 28a of the engagement recessed portion 28, the inner surfaces 28a, 28a being disposed facing each other in the length direction of the housing part 2.

Next, an assembly procedure of the power storage device 1 will be described. Firstly, before attaching the end plate 4, the cell groups 3, 3 each in which a plurality of battery cells 31 are stacked in advance are housed in the respective housing spaces 20, 20 of the housing part 2. Then, a plurality of vehicle body fastening members 5 are attached to the housing part 2.

As illustrated in FIG. 5, the vehicle body fastening member 5 is attached to the housing part 2 so that the flange portion 53 is disposed on top in a state in which the pair of engagement protruding portions 52, 52 are directed to the side wall portion 23 of the housing part 2. The pair of engagement protruding portions 52, 52 of the vehicle body fastening member 5 are fitted in the pair of engagement recessed portions 28, 28 of the housing part 2. When the engagement protruding portions 52, 52 are fitted in the engagement recessed portions 28, 28, the threaded portions 56, 56 in the engagement protruding portions 52, 52 are disposed coaxially with the insertion hole openings 27a, 27a in the inner surfaces 28a, 28a of the engagement recessed portion 28.

After the vehicle body fastening members 5 are attached to all the engagement recessed portions 28 of the housing part 2, the end plate 4 (4A, 4B) is attached to the housing part 2 to cover the openings 20a of the housing part 2, and the bolts 6 are inserted through the respective bolt insertion holes 41 in the end plate 4 and the respective bolt insertion holes 27 in the housing part 2. Among the plurality of bolts 6, the bolts 6 to be inserted through the bolt insertion holes 27 in the corners 2a, 2b in which the engagement recessed portions 28, 28 of the housing part 2 are provided have a length that allows the distal ends 6a of the bolts 6 to be disposed in the respective engagement recessed portions 28, 28. Therefore, after the distal ends 6a of the bolts 6 pass through the end plate 4, the distal ends 6a reach inside the engagement recessed portions 28, 28 of the housing part 2, thereby being threadedly engaged with the threaded portions 56, 56 provided in the engagement protruding portions 52, 52 of the vehicle body fastening member 5, as illustrated in FIG. 3. When the bolts 6 are further fastened in this state, the end plate 4 is firmly fastened to the housing part 2 and the vehicle body fastening members 5 are also firmly fastened to the housing part 2.

After all the vehicle body fastening members 5 are fixed to all the housing parts 2, 2, the power storage device 1 is fastened to the vehicle body frame (not illustrated) by inserting fastening members (not illustrated) through the fastening member insertion holes 55 in the flange portions 53 of the vehicle body fastening members 5, respectively.

In this way, the vehicle body fastening member 5 is fixed to the housing part 2 by threadedly engaging, with the threaded portion 56, the bolt 6 for fastening the end plate 4 to the housing part 2, whereby the vehicle body fastening member 5 can be easily positioned and reliably attached to the housing part 2 just by aligning the threaded portion 56 with the distal end 6a (bolt insertion hole 27) of the bolt 6. Since it is not necessary to weld the vehicle body fastening members 5 to the housing part 2 one by one in sequence to fix the vehicle body fastening members 5 to the housing part 2, the fixing operations of the vehicle body fastening members 5 are also simplified.

Since the threaded portion 56 of the vehicle body fastening member 5 can be aligned with the bolt insertion hole 27 just by engaging (fitting) the engagement protruding portion 52 protruding toward the housing part 2 with (in) the engagement recessed portion of the housing part 2, the vehicle body fastening member 5 can be further easily positioned with respect to the housing part 2. Since the bolt insertion holes 27 are provided inside the respective corners 2a, 2b having high rigidity in the housing part along the length direction of the housing part 2, both of the end plate 4 and the vehicle body fastening member 5 can be firmly fixed to the housing part 2.

The vehicle body fastening member 5 can be stably fixed to the housing part 2 by the pair of engagement protruding portions 52, 52. In addition, since the vehicle body fastening members 5 are disposed on the side wall portion 23 of the housing part 2, a dimension in the height direction of the power storage device 1 (housing part 2) can be suppressed even when the vehicle body fastening members 5 are attached to the housing part 2, whereby the power storage device 1 can be configured in a compact manner.

Figure 6:
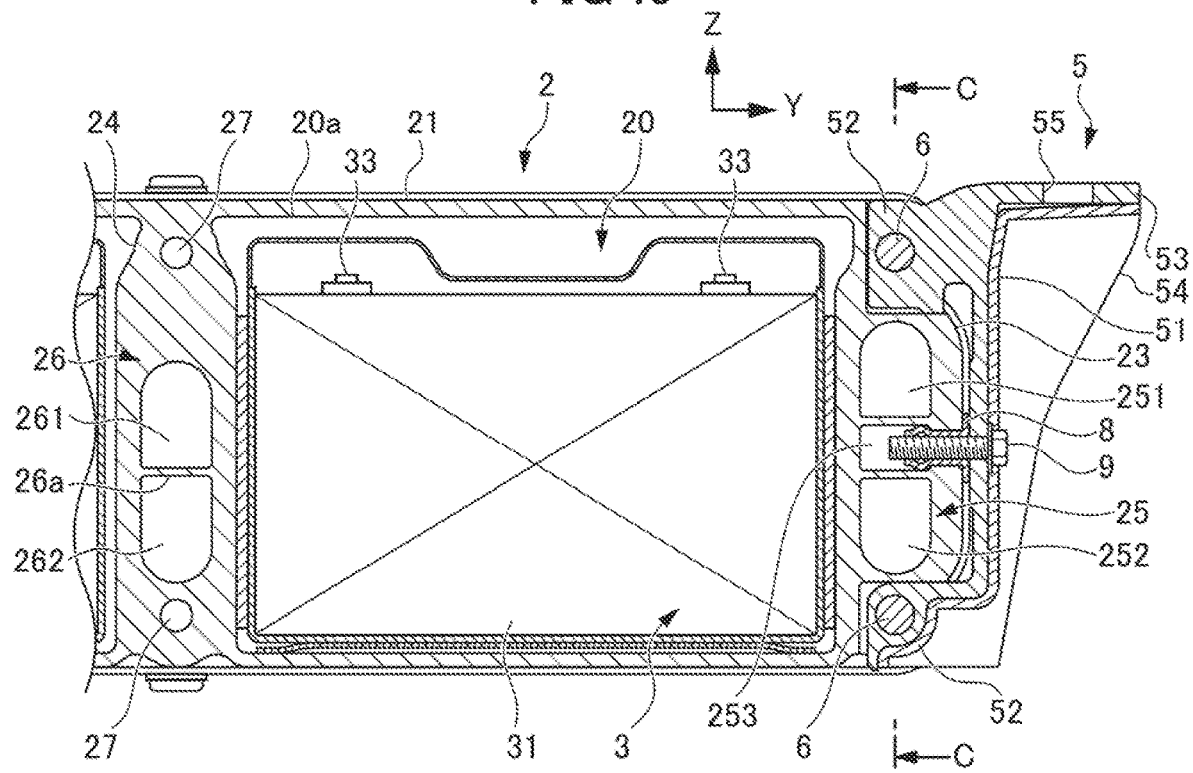
FIG. 6 is a cross-sectional view illustrating an attachment structure of a vehicle body fastening member of a power storage device according to another embodiment of the present invention.
Figure 7:
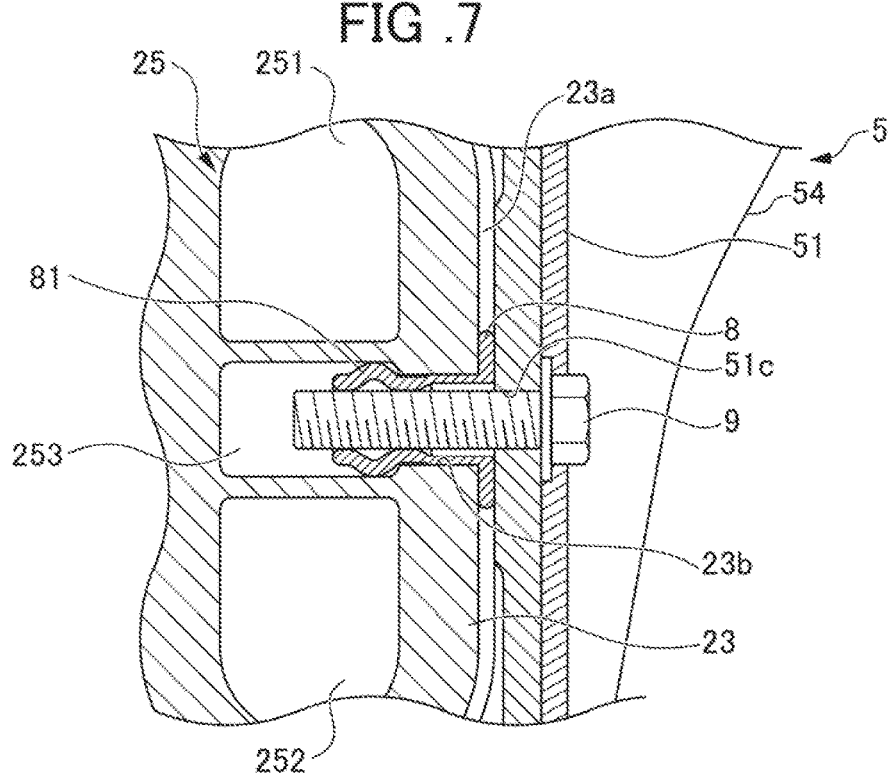
FIG. 7 is an enlarged view illustrating a portion in FIG. 6.
Figure 8:
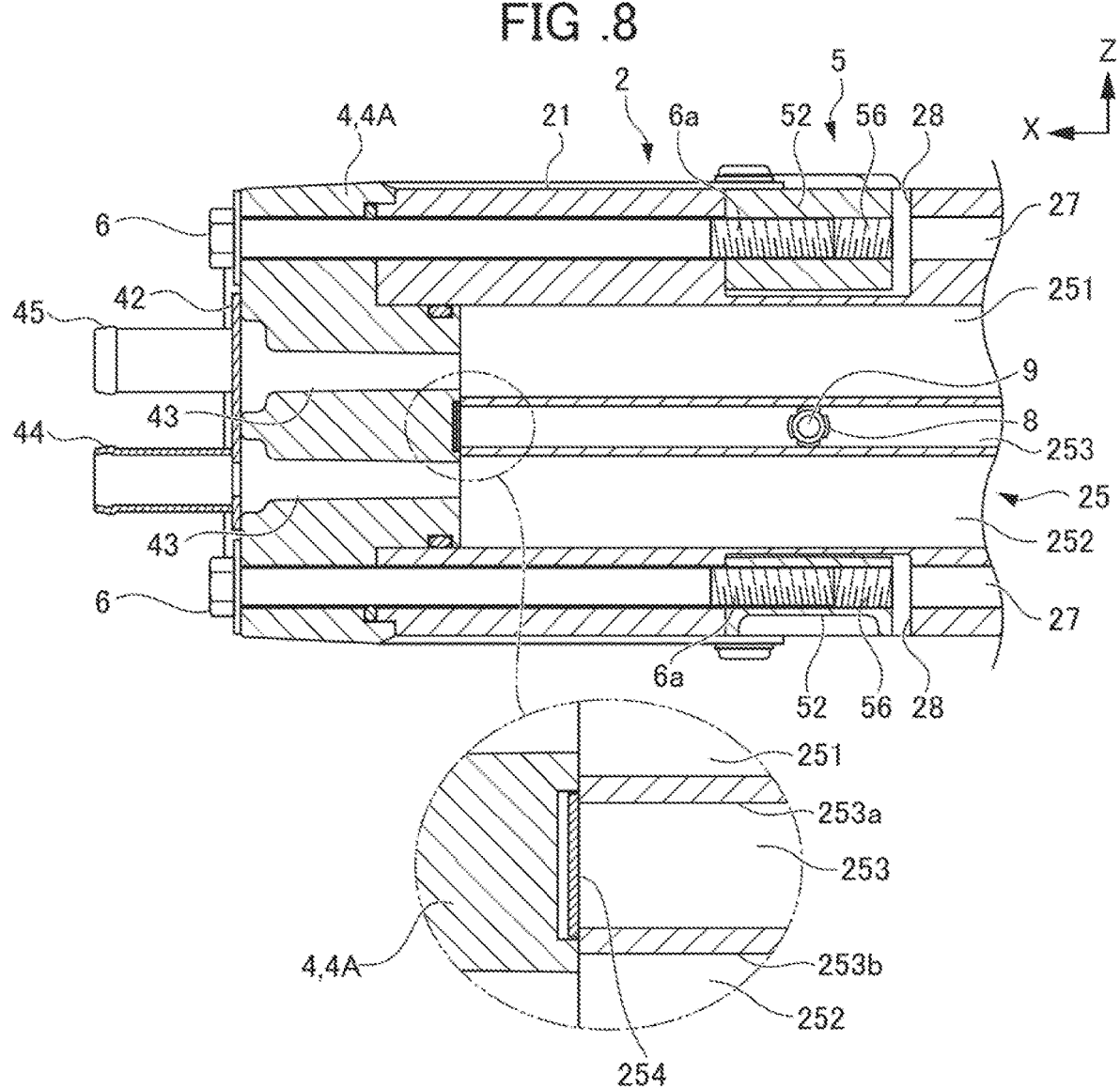
FIG. 8 is a cross-sectional view along line C-C in FIG. 6.

FIG. 6 is a cross-sectional view illustrating an attachment structure of a vehicle body fastening member of a power storage device according to another embodiment of the present invention. FIG. 7 is an enlarged view illustrating a portion in FIG. 6. FIG. 8 is a cross-sectional view along line C-C in FIG. 6. Since the portions identified with the same reference numerals as the power storage device 1 illustrated in FIG. 1 to FIG. 5 are the portions of the same configurations, the description thereof will be omitted here by referring to the above description.

As illustrated in FIG. 6, a cavity portion 253 is provided inside the side wall portion 23 of the housing part 2. The cavity portion 253 is disposed between the upper flow path 251 and the lower flow path 252 of the heat exchange medium flow path 25, and extends along the entire length of the housing part 2 in the length direction along the heat exchange medium flow path 25. That is, the upper flow path 251 is partitioned from the cavity portion 253 by an upper wall 253a of the cavity portion 253, and the lower flow path 252 is partitioned from the cavity portion 253 by a lower wall 253b of the cavity portion 253. As illustrated in FIG. 8, each end of the cavity portion 253 in the length direction (X direction) is closed by a closing member 254. Accordingly, the heat exchange medium in the heat exchange medium flow path 25 is prevented from flowing into the cavity portion 253.

As illustrated in FIG. 6 and FIG. 7, the vehicle body fastening member 5 disposed on the side wall portion 23 of the housing part 2 is further fixed to the side wall portion 23 by a blind nut 8 to be inserted into the cavity portion 253 through the outer surface of the side wall portion 23. Specifically, as illustrated in FIG. 7, in a portion of the side wall portion 23 to which the vehicle body fastening member 5 is attached, an insertion hole 23b for inserting the blind nut 8 is formed in an outer surface 23a corresponding to a position of the cavity portion 253, and the cylindrical blind nut 8 is inserted into the insertion hole 23b to protrude to an inside of the cavity portion 253.

The vehicle body fastening member 5 is attached to the side wall portion 23 by the bolts 6, 6 as described above, to cover the blind nut 8 with the fastening member body 51. The fastening member body 51 has a bolt insertion hole 51c at a position corresponding to the insertion hole 23b in the side wall portion 23, and a bolt 9 is inserted into the blind nut 8 through the bolt insertion hole 51c. The bolt 9 is threadedly engaged with a female thread (not illustrated) provided on the inner surface of the blind nut 8. When the bolt 9 threadedly engaged with the blind nut 8 is further fastened, a portion of the blind nut 8 disposed in the cavity portion 253 gradually contracts and thereby is expanded in the radial direction, resulting in forming an enlarged diameter portion 81. Thus, the fastening member body 51 of the vehicle body fastening member 5 is fixed to the outer surface 23a of the side wall portion 23.

In this way, the vehicle body fastening member 5 is fixed to the housing part 2 by the engagement protruding portions 52, 52, and is further fixed to the side wall portion 23 of the housing part 2 by the fastening member body 51, whereby the vehicle body fastening member 5 can be fixed more firmly to the housing part 2. The use of the blind nut 8 enables reliable fixing of the vehicle body fastening member 5, even when the thickness of the outer surface 23a of the side wall portion 23 through which the blind nut 8 is to be inserted is small.

In addition, the heat exchange medium flow path 25 in the side wall portion 23 is partitioned into the upper flow path 251 and the lower flow path 252 by the cavity portion 253, whereby heat exchange between the two flow paths 251, 252 can be suppressed and heat can be efficiently exchanged between the heat exchange medium and the battery cells 31.

The vehicle body fastening member 5 illustrated in the above-described embodiments includes the pair of engagement protruding portions 52, 52. However, it is only required that the vehicle body fastening member 5 includes at least one engagement protruding portion 52.

EXPLANATION OF REFERENCE NUMERALS

1 Power storage device
2 Housing part
2a, 2b Corner
20a Opening
23 Side wall portion
23a Outer surface (of side wall portion)
25 Heat exchange medium flow path
251 Upper flow path
252 Lower flow path
253 Cavity portion
27 Bolt insertion hole
28 Engagement recessed portion
3 Cell group
31 Battery cell
4, 4A, 4B End plate
5 Vehicle body fastening member
52 Engagement protruding portion
56 Threaded portion
6 Bolt
8 Blind nut

What is claimed is:

1. A power storage device comprising:
   a cell group in which a plurality of battery cells are stacked;
   a quadrangular cylindrical housing part that houses the cell group and has an opening at each end in a stacking direction of the battery cells;
   an end plate that covers the opening in the housing part;
   a vehicle body fastening member that is formed separately from the housing part and fastens the housing part to a vehicle body; and
   a bolt that fastens the end plate to the housing part,
   wherein the vehicle body fastening member has an engagement protruding portion that protrudes toward the housing part and a threaded portion to be threadedly engaged with the bolt in the engagement protruding portion,
   wherein an outer surface of the housing part includes an engagement recessed portion to be engaged with the engagement protruding portion of the vehicle body fastening member, and
   the vehicle body fastening member is fixed to the housing part by threadedly engaging the threaded portion with the bolt provided through the end plate and the housing part in the engagement protruding portion to be housed in the engagement recessed portion.

2. The power storage device according to claim 1, wherein the engagement recessed portion of the housing part is disposed in a corner extending in a length direction of the housing part, and
   a bolt insertion hole into which the bolt is to be inserted is provided inside the corner to open to the engagement recessed portion.

3. The power storage device according to claim 2, wherein the vehicle body fastening member includes a pair of the engagement protruding portions protruding in a U-shape toward the housing part, and
   the engagement recessed portions of the housing part are provided on the two corners adjacent to each other in the housing part to correspond to the pair of engagement protruding portions of the vehicle body fastening member, respectively.

4. The power storage device according to claim 1, wherein the vehicle body fastening member is disposed on side wall portions facing each other in a width direction of the housing part.

5. The power storage device according to claim 4, wherein a cavity portion is provided inside the side wall portion of the housing part, and
   the vehicle body fastening member is further fixed to the side wall portion by a blind nut to be inserted into the cavity portion from an outer surface of the side wall portion.

6. The power storage device according to claim 5, wherein the side wall portion of the housing part includes at least two heat exchange medium flow paths that are arranged in a height direction of the side wall portion along a length direction of the housing part, and
   the cavity portion is disposed between the two heat exchange medium flow paths.

* * * * *